United States Patent [19]

Plastina

[11] Patent Number: 5,328,290
[45] Date of Patent: Jul. 12, 1994

[54] COUPLING ARRANGEMENT FOR CYLINDRICAL MEMBERS

[75] Inventor: Armando N. Plastina, Santa Cruz, Calif.

[73] Assignee: Bel-Art Products, Inc., Pequannock, N.J.

[21] Appl. No.: 46,844

[22] Filed: Apr. 14, 1993

[51] Int. Cl.[5] .............................................. B25G 3/36
[52] U.S. Cl. ..................................... 403/391; 403/389; 403/385
[58] Field of Search ............... 403/391, 389, 396, 398, 403/186, 384, 385, 387

[56] References Cited

U.S. PATENT DOCUMENTS

| | | | |
|---|---|---|---|
| 3,157,415 | 11/1964 | Martin | 403/385 |
| 3,553,351 | 1/1971 | Lindsey | 403/391 |
| 3,825,358 | 7/1974 | Eisenhardt et al. | 403/385 |
| 3,887,291 | 6/1975 | Langren | 403/391 |
| 3,904,161 | 9/1975 | Scott | 403/391 |
| 4,032,245 | 6/1977 | Woodruff | 403/385 |
| 4,483,334 | 11/1984 | Murray | 403/391 |
| 4,619,282 | 10/1986 | Battiston | 403/399 |
| 5,060,961 | 10/1991 | Bontrager | 403/391 |
| 5,242,240 | 9/1993 | Gorham | 403/389 |

*Primary Examiner*—John T. Kwon
*Attorney, Agent, or Firm*—Anthony F. Cuoco

[57] ABSTRACT

A center member is disposed between a pair of end members. A cylindrical member is accepted in a hole in one of said end members and an other cylindrical member is accepted in a cavity formed by the cooperative arrangement of the other of the end members and the center member whereby the one and the other cylindrical members which are in parallel planes are coupled. The arrangement is such that cylindrical members of varying diameters and having their axes angularly displaced relative to each other within their parallel planes are accommodated.

7 Claims, 2 Drawing Sheets

COUPLING ARRANGEMENT FOR CYLINDRICAL MEMBERS

BACKGROUND OF THE INVENTION

This invention relates generally to a coupling arrangement and, particularly, to a coupling arrangement for coupling a pair of cylindrical members which are disposed in parallel planes and are angularly displaced in said parallel planes relative to each other.

A variety of devices have shafts or bars which must be coupled to other like cylindrical members on other devices. For purposes of illustration, combination basket/table top apparatus for use with wheelchairs is available. The apparatus has cylindrical legs or the like which are coupled to cylindrical bars which are part of the wheelchair for supporting the apparatus on the wheelchair. The bars and the legs, while being in parallel planes, are angularly displaced relative to each other within their planes. Prior to the present invention, the required coupling has been difficult to achieve.

SUMMARY OF THE INVENTION

This invention contemplates a coupling arrangement including a pair of end members and a center member disposed between the end members, and which end and center members are in the same plane. One of the end members has a transversely extending hole which accepts a first cylindrical member of a finite diameter, or accepts adapters which, in turn, accept first cylindrical members of varying diameters. The other of the end members and the center member are configured and cooperatively arranged to provide a transversely extending cavity for accepting second cylindrical members of varying diameters whereby the first and second cylindrical members are coupled. The first and second cylindrical members are in parallel planes. The second end member and the center member have facing serrated surfaces. An arrangement is provided whereby the facing serrated surfaces are disengaged and engaged. When the serrated surfaces are disengaged, the first end member is angularly displaceable to a desired position relative to the center and second end members. The first end member is maintained in the desired angularly displaced position when the facing serrated surfaces are engaged. This arrangement enables coupling of first and second cylindrical members which have their axes angularly displaced relative to each other within their parallel planes.

DETAILED DESCRIPTION OF THE INVENTION

Figure 1:
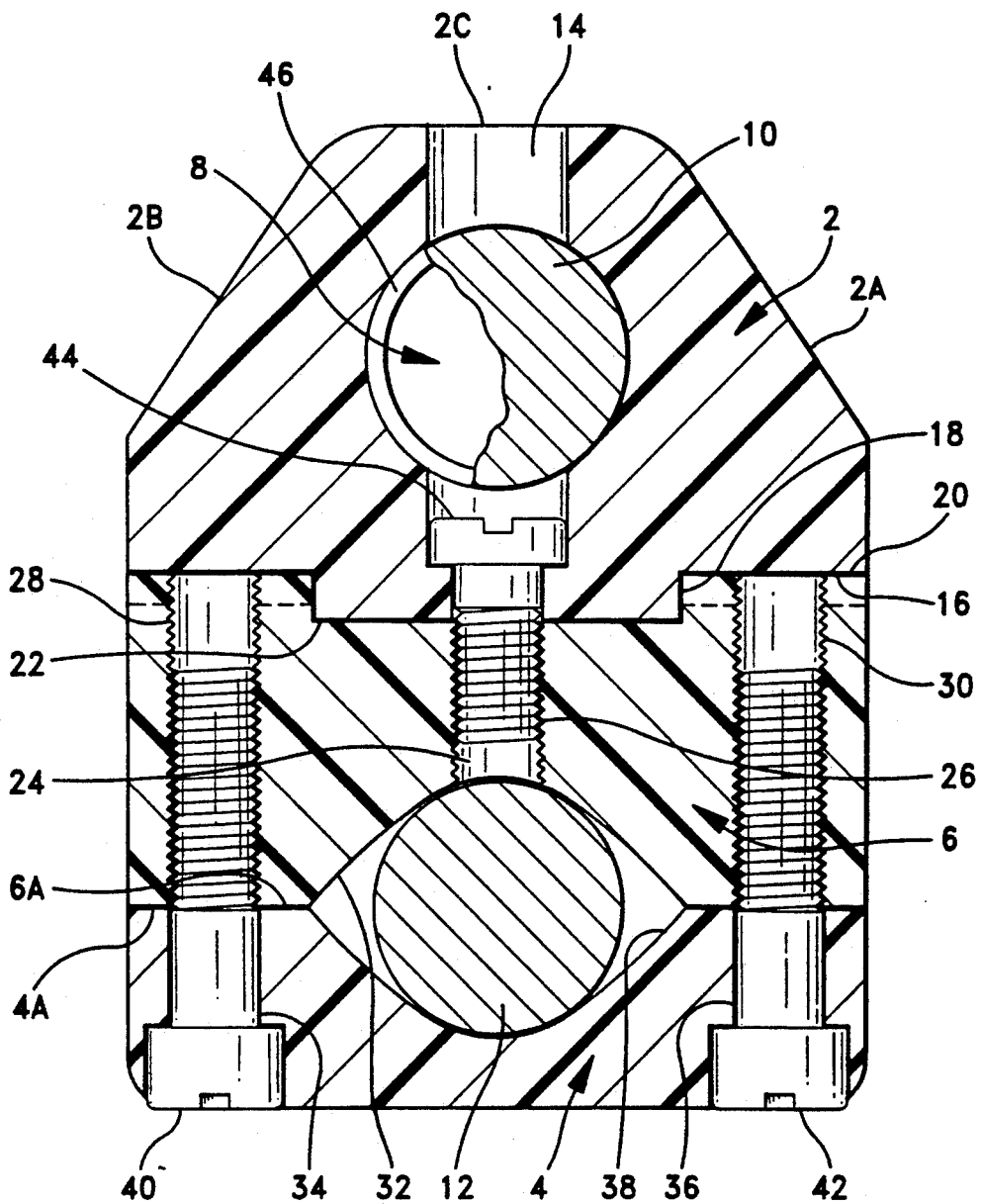
FIG. 1 is a sectioned elevational view of a coupling arrangement for cylindrical members according to the invention.

With reference to the drawings and with particular reference to FIG. 1, a first end member is designated by the numeral 2 and a second end member is designated by the numeral 4. A center member 6 is disposed between end members 2 and 4. In the preferred embodiment of the invention, members 2, 4 and 6 are molded of a suitable plastic material such as, for purposes of example, a glass filled polycarbonate. Members 2, 4 and 6 are cylindrical in shape and are in the same plane.

End member 2 has a pair of opposite truncated sides 2A and 2B which converge to a substantially flat rectangular top surface 2C. A hole 8 extends transversely through the sides of end member 2 opposite truncated sides 2A and 2B. Hole 8 accepts a cylindrical member such as a rod or the like 10 in slip fit relation. It is desired to couple cylindrical member 10 to a cylindrical member such as a rod or the like 12. Cylindrical members 10 and 12 are disposed in parallel planes.

A hole 14 extends substantially axially and longitudinally through end member 2.

The surface of end member 2 opposite top surface 2C thereof has a serrated rim 16 (best shown in FIGS. 2 and 3) and a flange 18 extending downwardly therefrom.

Center member 6 has a serrated rim 20 (such as serrated rim 16) which faces serrated rim 16, and a recess 22 for receiving flange 18 of end member 2.

A hole 24 extends substantially axially through center member 6. Hole 24 is in alignment with hole 14 in end member 2 and carries a threaded insert 26 for purposes which will be hereinafter described.

Center member 6 carries a threaded through hole 28 on one side of hole 24 near the outer circumference of said member, and carries another threaded through hole 30 on the opposite side of hole 24 near the outer circumference of the center member.

End 6A of center member 6 opposite serrated rim 20 has an arcuate cavity 32 extending transversely therethrough.

End member 4 carries threaded through holes 34 and 36 which are in alignment with holes 28 and 30, respectively, in center member 6. End 4A of end member 4 faces end 6A of center member 6 and has an arcuate cavity 38 extending transversely therethrough. Cavities 32 and 38 which are disposed in opposing relationship cooperate for accepting cylindrical member 12 in slip fit relation.

Screws 40 and 42 are in threaded engagement with holes 34 and 28, and with holes 36 and 30, respectively. Thus, arcuate cavities 32 and 38 in center member 6 and end member 4, respectively, can be displaced away from or toward each other by loosening or tightening screws 40 and 42, respectively, as the case may be, whereby cylindrical members 12 of varying diameters can be accommodated. The arrangement described also facilitates installation and removal of the disclosed clamping arrangement from member 12 as by completely disengaging screws 40 and 42, as will now be appreciated.

It will be appreciated that cylindrical members 10 and 12, while disposed in parallel planes, may not have their longitudinal axes parallel. That is to say, the longitudinal axis of members 10 and 12 may be angularly displaced relative to one another. The coupling arrangement of the present arrangement accommodates this situation by permitting angular displacement of end member 2 relative to center member 6 and end member 4.

Thus, hole 14 in end member 2 serves as a well for a screw 44, and which screw is in threaded engagement with threaded insert 26. When screw 44 is loosened, serrated rims 16 of end member 2 and 20 of end member 6 are disengaged and end member 2 can be angularly displaced about its longitudinal axis Y—Y as required.

When a desired angular displacement has been achieved, i.e. an angular displacement corresponding to the relative angular displacement of the axis of member 10, screw 44 is tightened against the bottom of hole 14 whereby serrated rims 16 and 20 engage so as to maintain end member 2 in the desired angularly displaced position. Hence, the axes of cylindrical members 10 and 12 can be angularly displaced relative to one another within their respective parallel planes and can still be coupled by the coupling arrangement herein described as is the intention of the invention.

With continued reference to FIG. 1, the end of hole 8 opposite the end thereof which accepts cylindrical member 10 has a shoulder 46. The purpose of shoulder 46 is to provide a stop for cylindrical member 10 when the member is accepted in hole 8 in slip fit relation as aforenoted and as will be recognized as desireable.

In the form of the invention shown in FIG. 1, hole 8 accepts a cylindrical member 10 of a particular diameter. It is recognized that this limits the use of the invention. In this regard, the forms of the invention shown in FIGS. 5 and 6 will be seen to accommodate cylindrical members of varying diameters, as is desireable.

Figure 2:
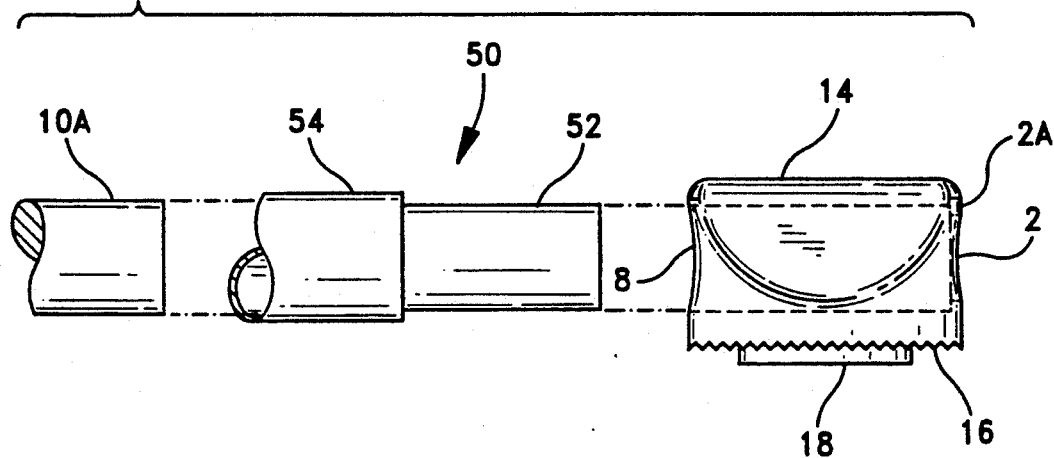
FIGS. 2 and 3 are diagrammatic representations illustrating the feature of the invention wherein adapters are arranged with a first end member of said arrangement so that said first end member accepts cylindrical members of varying diameters.
Figure 3:
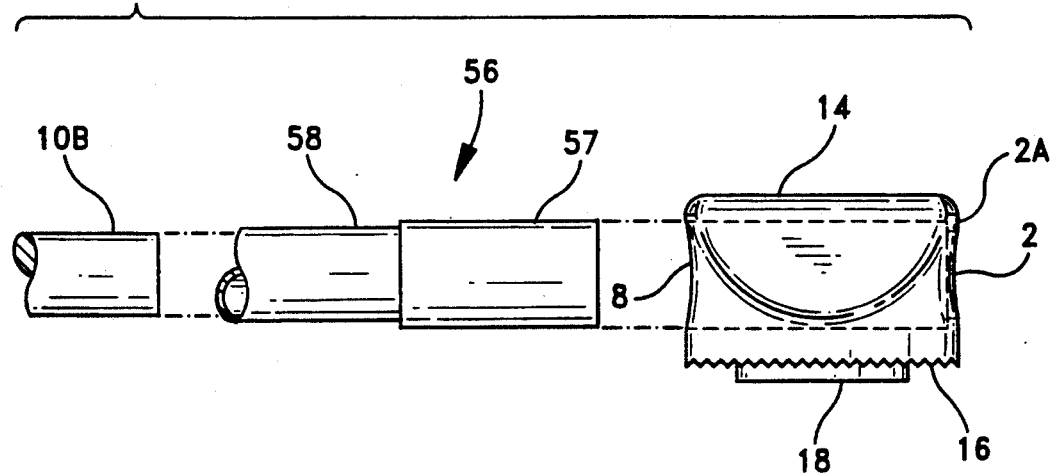

Thus, with reference first to FIG. 2, an adapter is designated generally by the numeral 50 and includes a cylindrical member 52 integral with a tubular member 54. Cylindrical member 52 is disposed in slip fit relationship in hole 8 as is shaft 10 shown in FIG. 1 and a cylindrical member 10A is likewise disposed within tubular member 54. In the embodiment of the invention shown in FIG. 2, hole 8 will thus accept, via adapter 50, a cylindrical member of a larger diameter than cylindrical member 10 shown in FIG. 1.

With reference to the form of the invention shown in FIG. 2, an adapter is designated generally by the numeral 56 and has a cylindrical member 57 which is of the same diameter as cylindrical member 52 and has an integral tubular member 58 which is of a smaller diameter than tubular member 54. Thus, a cylindrical member 10B is inserted in tubular member 58 and cylindrical member 57 is accepted in slip fit relation in hole 8, whereby adapter 56 accommodates a cylindrical member of a smaller diameter than member 10 shown in FIG. 1.

In this regard, it will be appreciated that various interchangeable adapters such as 50 and 56 may be provided to accommodate particular common or standard diameters of members 10A and 10B consistent with the use of the invention.

There has thus been described a coupling arrangement for coupling a pair of cylindrical members disposed in parallel planes, and wherein the cylindrical members are angularly displaced relative to each other within their planes. The arrangement is such that cylindrical members of varying diameters can be accommodated.

With the above description of the invention in mind, reference is made to the claims appended hereto for a definition of the scope of the invention.

What is claimed is:

1. A coupling arrangement for coupling one cylindrical member in one plane to an other cylindrical member in an other plane parallel to the one plane, comprising:
   a first end member;
   a second end member;
   a center member disposed between the first and second end members;
   the first end member having a transversely extending hole which accepts the one cylindrical member of a finite diameter;
   the center and second end members cooperating to provide a transversely extending opening for accepting the other cylindrical member of varying diameters, whereby the one and the other cylindrical members are coupled together;
   the first and second end members and the center member being in a common plane; and
   the first end member being angularly displaceable in the common plane, whereby the transversely extending hole accepts the one cylindrical member when said one cylindrical member is displaced in the one plane relative to the other cylindrical member in the other plane parallel to the one plane.

2. A coupling arrangement as described by claim 1, including:
   the first end member having a serrated surface;
   the center member having a serrated surface which faces the serrated surface of the first end member; and
   means associated with the first end member and the center member for engaging and disengaging said facing serrated surfaces, with said facing serrated surfaces being disengaged, so that said first end member is angularly displaceable in the common plane, and being engaged for maintaining said first end member in an angularly displaced position.

3. A coupling arrangement as described by claim 2, wherein the means associated with the first end member and the center member for engaging and disengaging said facing serrated surfaces includes:
   a hole extending axially through the first end member and within the center member;
   a threaded insert disposed within said hole within the center member;
   a threaded member received by said axially extending hole and being in threaded engagement with the threaded insert; and
   said threaded member being loosened within the threaded insert for disengaging the serrated surfaces, and tightened within said threaded insert for engaging said serrated surfaces.

4. A coupling arrangement as described by claim 2, including:
   the center member having a surface opposite the serrated surface and a cavity extending transversely through said opposite surface;
   the second end member having a surface facing the opposite surface of the center member and a cavity extending transversely through said surface facing the opposite surface of the center member;
   the cavity extending transversely through the opposite surface of the center member and the cavity extending through the surface of the second end member facing the opposite surface of the center member being aligned in opposing relation for providing the opening for accepting the other cylindrical member.

5. A coupling arrangement as described by claim 2, including:
   a first threaded hole extending through the second end member and into the center member on one side of the opening;
   a second threaded hole extending through the second end member and into the center member on the other side of said opening;

a first threaded member threadingly engaging the first hole and a second threaded member threadingly engaging the second hole; and said first and second threaded members being tightened and loosened within the first and second holes, respectively, for adjusting the size of said opening for accepting the other cylindrical members of varying diameters.

6. A coupling arrangement as described by claim 1, wherein:

the transversely extending hole in the first end member alternatively accepts interchangeable adapters; and each of said interchangeable adapters accepting the one cylindrical member of a particular diameter.

7. A coupling arrangement as described by claim 1, wherein:

the transversely extending hole in the first member has a shoulder at the end of said hole opposite the end thereof at which the first cylindrical member is accepted by said hole; and said shoulder being a stop for said first cylindrical member within said hole.

* * * * *